March 9, 1926.  1,576,056
R. LIEFKE
FLUID CONTROL APPARATUS
Filed Dec. 11, 1924    2 Sheets-Sheet 2
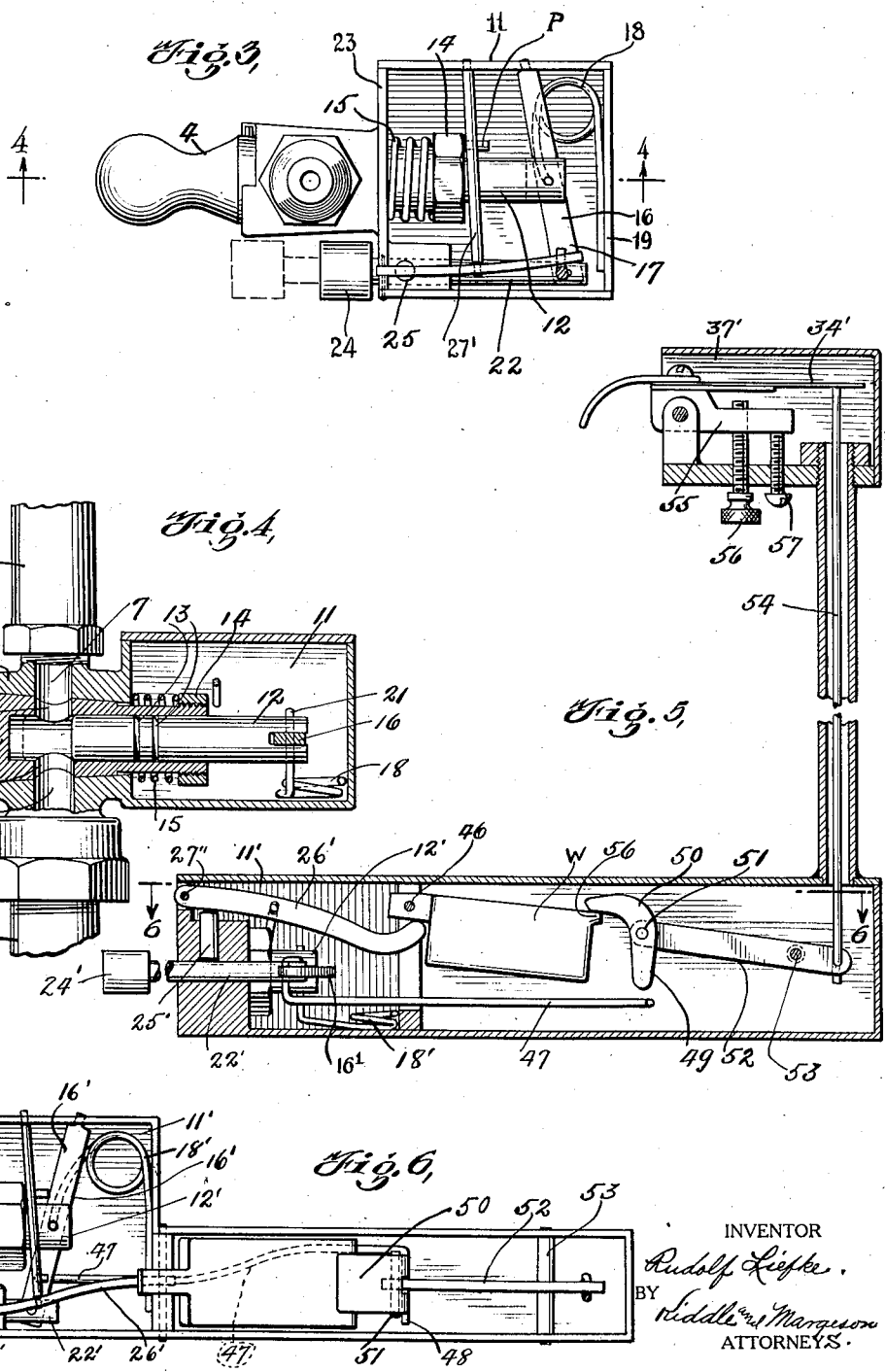
INVENTOR
Rudolf Liefke.
BY
ATTORNEYS.

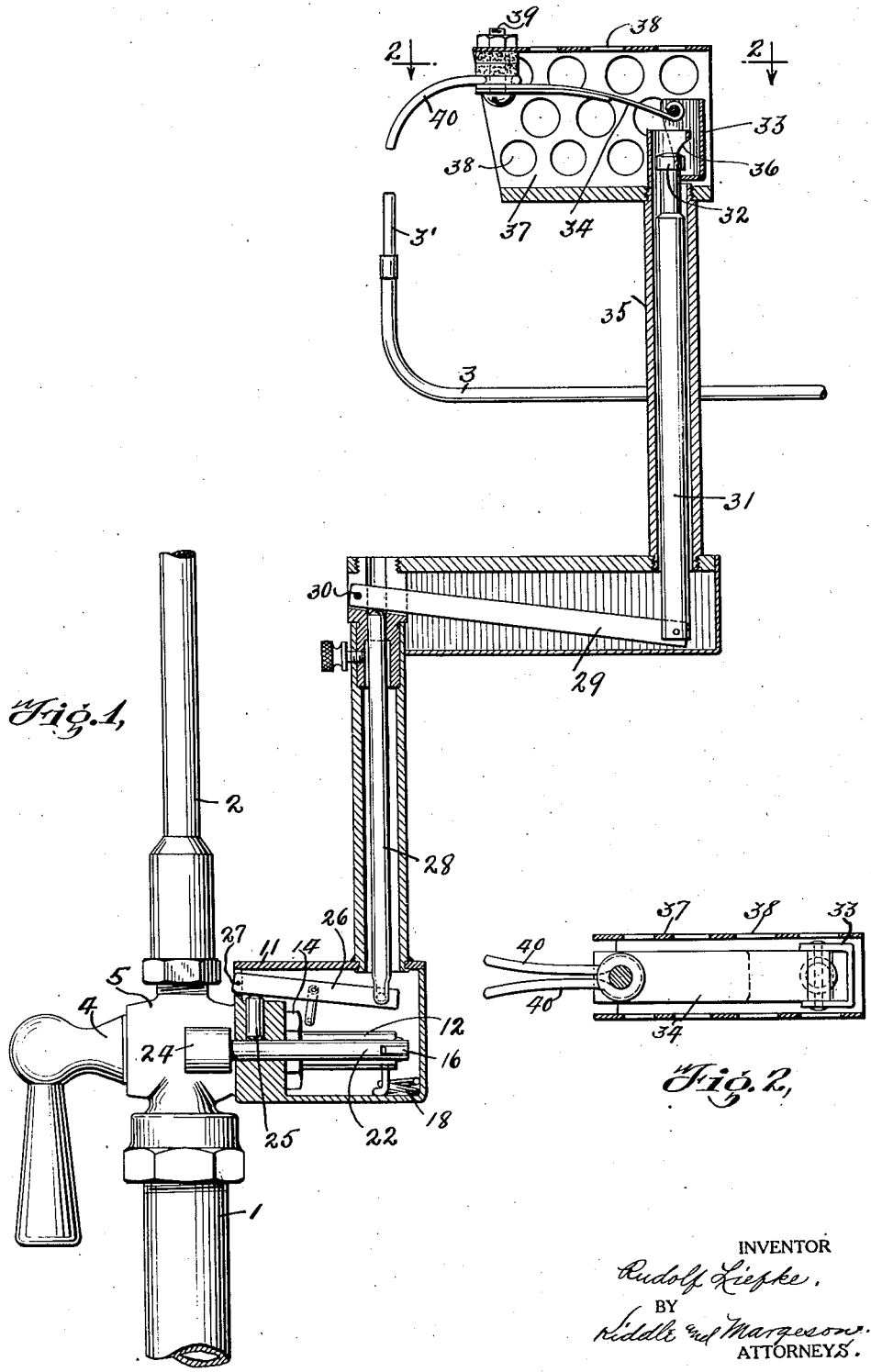

Patented Mar. 9, 1926.

1,576,056

UNITED STATES PATENT OFFICE.

RUDOLF LIEFKE, OF NEW YORK, N. Y., ASSIGNOR TO R. LIEFKE & COMPANY, A CO-PARTNERSHIP CONSISTING OF RUDOLF LIEFKE, ROBERT ADELMANN, AND ROBERT E. LEYENDECKER, ALL OF NEW YORK, N. Y.

FLUID-CONTROL APPARATUS.

Application filed December 11, 1924. Serial No. 755,206.

*To all whom it may concern:*

Be it known that I, RUDOLF LIEFKE, a citizen of the Republic of Germany, and a resident of New York city, in the county of New York and State of New York, have invented a certain new and useful Improvement in Fluid-Control Apparatus, of which the following is a specification.

My invention relates to an improvement in gas control devices and has for an object the provision of an apparatus of this general character so constructed and arranged that the same may be readily applied to existing installations such as water heaters, gas ranges, both for household and commercial use, gas-burning furnaces and the like, an object of the invention being the provision of a device which will cut off the supply of gas should the same be accidentally extinguished from any cause whatsoever.

In general, my improved apparatus comprises a thermostat which is adapted to be controlled by the heat of the gas flame, the thermostat being so arranged with respect to the other parts of the apparatus that when the thermostat cools, due to the gas being extinguished, it will automatically release or start in operation certain mechanism which is connected to the pipe which is supplying gas, to shut off the same automatically.

In the accompanying drawings I have illustrated two embodiments of my invention—

Figure 1 illustrating one embodiment thereof in part sectional elevation;

Fig. 2 being a section on the line 2—2 of Fig. 1;

Fig. 3 being a plan view of a part of the mechanism of Fig. 1; and

Fig. 4 being a section on the line 4—4 of Fig. 3

Fig. 5 is a sectional elevation of another embodiment of my invention; while

Fig. 6 is a section taken substantially on the line 6—6 of Fig. 5.

Referring to the drawings in detail and first of all to the embodiment of Figs. 1 to 4 inclusive, 1 designates a pipe which may be connected to any suitable source of gas supply. 2 is the gas pipe for conducting gas from the pipe 1 to a burner not shown. 3 designates a pilot pipe and 3' the tip thereof, it being understood that this pipe is connected to the pipe 2 or between the pipe 2 and pipe 1 in the usual way and that it is for the purpose of igniting the gas at the burner connected to the pipe 2.

The flow of gas from the pipe 1 through the pipe 2 is controlled by the usual cock 4, the internal structure of which is illustrated in Fig. 4. It will be seen from this figure that the two pipes 1 and 2 are screwed into a T-union 5 provided with ports 6 and 7. I will refer to port 6 as an inlet port, and 7 as an outlet. The stem 8 of the cock 4 is inserted into the union 5 and rotatable therein and, like the union 5, is provided with ports 9 and 10. When the stem is in the position of Fig. 4, which is open position, the ports 6, 9, 10 and 7 are in register, so as to permit of a flow of gas from the pipe 1 to the pipe 2.

The stem or plug 8 extends through the union 5 into a box or casing 11 to provide a bearing for a rod or plug 12, which is adapted to be reciprocated longitudinally of the stem 8. This plug 12 is a gas controlling plug, inasmuch as the same when moved to the left to the dotted line position of Fig. 4 prevents the flow of gas from the pipe 1 to the pipe 2, the plug when in this position shutting off the ports 6, 9, 10 and 7 above referred to. In order that there may be no leak of gas past this plug, I preferably provide the same with oil grooves 13, which are kept filled with oil or grease and which I find provide a satisfactory packing. It is to be understood, of course, that other forms or types of packing may be employed if desired.

The inner end of the stem 8 of the cock 4 is provided with a threaded cap 14 and between this and the side of the union 5 I provide a coil spring 15, this spring always being under tension so as to force the stem 8 inwardly with respect to the union 5, thereby maintaining the stem 8 gas-tight in its bearing.

The inner end of the gas controlling plug 12 is slotted to receive a lever 16 pivoted intermediate its ends to said plug, said lever extending transversely of the box or casing 11, one end of this lever extending into an opening provided for that purpose in one wall of the casing 11. Within the casing 11 I provide a coil spring 18, one end thereof lying up against the side or wall 19 of the casing 11, while the other end is passed into the end of the gas controlling plug 12, thereby anchoring the spring to the plug as well as pivotally attaching the lever 16 to this plug. The end of the spring 18 passing through the plug 12 has been designated 21. This is only one form of spring which may be employed, inasmuch as other forms may be used if desired. The end 17 of the lever 16 is pivotally attached to a plug controlling rod 22, this rod, as will be pointed out hereinafter, being provided for the purpose of operating the gas controlling plug 12 when the supply of gas is to be turned on. For convenience, this rod 22 is passed through the wall 23 of the enclosure or casing 11 and is provided with a somewhat enlarged head 24 on the exterior of the casing. The rod 22 is adapted to be held in its innermost position, that is to say, in the position shown in Fig. 1, which is open position, so far as the supply of gas is concerned, by means of a pin 25, the pin extending vertically with respect to the rod and its lower end engaging the rod to frictionally hold the same in open position against the action of the spring 18, which, constantly tends to force the gas controlling plug 12 to closed position. To provide means for holding the pin 25 in contact with rod 22, I pivot a lever 26 in the casing 11, this lever having one end pivoted at 27 while its other end is pivotally attached to a vertically extending rod 28. Inasmuch as the point of contact of the pin 25 with the lever 26 is but a short distance from the pivot 27 as compared to its distance from the point of attachment to the rod 28, in fact actually 1:5, it will be seen that but little pressure is required on the end of the lever 26 to supply the required power.

In order that the lever 26 may be raised out of engagement with the pin 25 when the gas supply is to be shut off manually, I attach a pin P to the valve stem 8, so that when the same is rotated this pin will be raised to hit the pin 27', which extends transversely of the casing 11 and has one end inserted into the lever 26 and its other end inserted into one wall of the casing 11.

To increase the weight on the lever 26, or rather, to increase the pressure on the outer end of this lever and thereby increase the pressure applied to pin 25, I provide the lever 29 pivoted at 30 and resting upon the upper end of the rod 28. The outer end of the lever 29 is in turn pivotally attached to a vertically extending rod 31. It will be seen, therefore, that the power applied to the outer end of the lever 26 in a direction to force this lever into engagement with the pin 25 is derived from the rod 31, the lever 29 and the rod 28. I may here mention that in actual practice I prefer the distance from the pivot 30 of the lever 29 to its point of contact with rod 28 as compared with the distance from this point of contact to the point of attachment of the lever to rod 31 to be about 1:20. The upper end of the rod 31 is provided with a head 32 adapted to cooperate with a catch member 33 which is attached pivotally to the free end of a thermostatic strip 34, the point of attachment of the strip being eccentric to the catch. The rod 31 is enclosed in a tubular casing 35, and the upper end thereof, which receives the head 32, is cut away to provide a cam surface 36.

The casing 35 supports a box-like casing structure 37, the top and side walls of which are provided with openings 38 for ventilation purposes. Attached to the top of this casing is the thermostatic strip 34, which is attached thereto by a screw 39, this same screw attaching metal members 40 to the casing, the members 40 being extended so as to overlie the pilot tip 3', to receive the heat of the flame therefrom and conduct the same to the thermostat 34. A strip of insulation is preferably inserted between these members and the casing.

The operation of the device above described is as follows: When the device is cold the free end of the thermostat 34 together with the catch member 33 carried thereby will be raised from the position indicated on Fig. 1 until the lower end of the catch disengages the head 32 of the rod 31. Assuming now that it is desired to place the device in operation, the rod or plug 22 is pushed inwardly, that is to say, to the right, as viewed in Fig. 1, it being assumed, of course, that the stop cock 4 has been previously moved to the position shown in Fig. 4. Pushing in of the rod or plug 22 will carry the gas controlling plug or valve 12 to the right so that gas may flow from the supply pipe 1 to and through the ports 6, 9, 10 and 7 into the pipe 2. Gas is also free to flow through the pilot pipe 3 to the tip 3'. The weight of the rods 31 and 28 through the leverage system above described will at this time force the lever 26 downwardly into contact with the plug 25, forcing the same into contact with the member 22 to hold the latter in its inward position against the action of the spring 18 which is tending to close the valve or plug 12. The pilot being lighted, will now heat the metal 40, this heat being conducted to the thermostat 34. This will cause the heat control-element or thermostat, that is to say, its free end, to move downwardly, carrying with it the trip 33. The trip, as the lower end thereof moves downwardly, will swing inwardly about its pivot to the position shown in Fig. 1, following the cam surface 36 until the bottom of the trip swings beneath the head 32 on the rod 31. The apparatus will remain in this position as long as the gas remains lighted. Should the gas be blown out or extinguished from any other cause, the thermostat 34 will cool off, the cooling of the thermostat causing the same to straighten out, thereby raising its free end and the trip 33. The lifting of this trip will bring the bottom thereof into engagement with the underside of the head 32 on the rod 31 to raise the rod and to thereby relieve the pressure on the rod 28 and hence on the pin 25. This will permit the spring 18 to overcome the pressure of the pin 25 on the member 22, with the result that the spring 18 will move the gas controlling plug 12 to the left to shut off the gas flowing from the supply pipe 1. As the thermostat 34 cools off and its free end moves upwardly carrying the trip 33, the latter engaging the cam face 36 provided on the upper end of the tube or casing 35 will be forced outwardly from beneath the head 32, with the result that the rod 30 and all the members connected thereto can again fall to the position shown in Fig. 1. On the next operation it is merely necessary to again move the member 22 inwardly or to the right and light the gas as before, the member 22 remaining in this position due to the fact that the rods 31 and 28, through their respective levers, are forcing the lever 26 down into engagement with the pin 25 to force this pin into contact with the member 22, as in the first instance.

It will be seen, therefore, that I have provided an apparatus wherein, should the gas be extinguished accidentally without shutting off the supply of gas at the union 5, the apparatus will automatically return to gas shut off position and will remain in this position until the parts are again operated and the gas lighted. The cock 4 may be operated each time the gas is turned on or off, as desired, or may be left in open position at all times. As a matter of fact, this cock may be dispensed with entirely, if desired.

In the apparatus illustrated in Figs. 5 and 6 I have modified somewhat the construction above described, although the principle employed is the same. In this embodiment of my invention 8' designates a stem corresponding to the stem 8 of Fig. 4, while 12' designates the shut-off plug corresponding to the plug 12 of Fig. 4. 26' designates a lever corresponding to the lever 26 of Fig. 1, this lever being pivoted at 27". This lever is for the purpose of engaging a pin 25' to force the same downwardly into engagement with the plug controlling rod 22' corresponding to the member 22 of Fig. 1. The lever 26' is held in its downward position, that is to say, in position to engage the pin 25', by a weight W pivoted at 46.

The plug 12' is provided with a lever 16' similar to the lever 16 of Fig. 1 and this lever has one end pivoted in one wall of the casing 11' of the device, while its other end is attached to the plug controlling rod 22'. By this construction, as the member 22' is pushed inwardly the plug 12' will be pushed inwardly also to permit the supply of gas to the device. Attached to the lever 16' intermediate its points of attachment to the plugs 12' and 22' is a member 47 having a hooked portion 48 at its outer end. This hook is adapted to co-operate with one arm 49 of a bell crank lever, the other arm 50 of this lever being adapted to co-operate with the weight W above referred to. This bell crank lever is pivoted at 51 to another lever 52, this lever in turn being pivoted at 53. At the extreme end of the lever 52, that is, beyond the pivot 53, I pivotally attach a wire or small rod 54 extending vertically and its upper end co-operating with a thermostat 34'. This thermostat may be of any desired construction and is adapted to be operated by the heat from a pilot similar to the device of Fig. 1. In the construction illustrated the thermostat is carried by an arm 55 pivoted to the casing 37'. 56 and 57 are regulating screws.

The operation of this device is as follows: Assuming the parts are in the position shown in Fig. 5, for example, the member 22' is pushed inwardly to permit the gas to flow. This member will remain in its inward position, due to the pressure of the weight W upon the lever 26', which in turn presses the pin 25' into engagement with 22'. As the thermostat 34' heats up its right hand end will move upwardly, permitting the rod 54 to move upwardly also. As the rod 54 moves upwardly due to the weight of the lever 52, the latter moves downwardly. As this end of the lever 52 gradually drops, the arms 50 and 49 will be swung about the pivot until finally the arm 50 will move downwardly under the hook or catch 56 on the end of the weight W near the top thereof. At the same time the arm 49 will move inside the hook 48. The weight W, however, will, of course, still remain in the same position. Should the gas now become extinguished, the thermostatic strip 34' will straighten out again and in so doing will push downwardly on the top of the rod 54, which has been raised due to the swing of the lever 52 about its pivot 53, and the lever 52 will be raised also, carrying with it the bell crank arms 49 and 50. Raising of the arm 50, which is now in engagement with the catch 56, will force the weight W upwardly, thereby relieving the pressure on the lever 26' and pressure on the pin 25', thereby permitting the member 22' to move to the left or closed position under the action of its spring 18'.

As the plug 12' moves to the left, as viewed in Fig. 5, the hook 48 engages the bell crank arm 49 and rocks the arms 49 and 50 about the pivot 51 in a clockwise direction, freeing the arm 50 from the weight W to permit the weight to fall again and the arm 50 to assume again a position above the weight W. The lever 52 will then be in about the same position as shown in Fig. 5, ready for the next operation.

While I have illustrated and described an embodiment of my invention, it is to be understood that changes may be made in the details thereof within the purview of my invention.

What I claim is:

1. In a gas controlling device the combination of a valve for controlling the supply of gas, a spring for closing said valve, a weight for resisting said spring throughout the normal operation of the device, and a heat controlled element for releasing said weight to cause the valve to close under conditions other than normal.

2. In a gas controlling device the combination of a valve for controlling the supply of gas, a burner the supply of gas to which is controlled by said valve, a spring for forcing said valve to closed position, a weight opposing said spring, a thermostat adjacent said burner and controlled thereby, said thermostat controlling said weight whereby when the gas is extinguished at said burner said weight will be released to permit said valve to close under the action of said spring.

3. In a gas controlling apparatus the combination of a gas controlling valve, a spring constantly urging the same to closed position, means for manually actuating said valve to open position against the action of said spring, a weight for maintaining said valve in open position under normal conditions, and a thermostat controlling said weight and adapted to relieve the pressure thereof upon said gas controlling valve under conditions other than normal to permit the valve to close under the action of said spring.

4. In a gas controlling apparatus the combination of a gas controlling plug, a lever pivotally attached intermediate its ends to said plug, a plug controlling rod attached to said lever, a spring for exerting a pressure upon said gas controlling plug constantly in a direction to move the same to closed position, said plug controlling rod being operable when actuated to move the plug in the opposite direction against the action of said spring, and means co-operating with said plug controlling rod for maintaining the gas controlling plug in open position under predetermined conditions.

5. In a gas controlling apparatus the combination of a gas controlling plug, a lever pivoted intermediate its ends to said plug, a spring co-operating with said plug and adapted to exert a pressure upon the same in a direction to move the plug to closed position, a plug controlling rod attached to said lever and manually operable to move the plug to open position against the action of said spring, and a weight adapted to co-operate with said rod to hold the same in actuated position under predetermined conditions to maintain the gas controlling plug in open position.

6. In a gas controlling apparatus the combination of a gas controlling plug, a spring constantly urging the same to closed position, a weight for holding the plug in open position against the action of said spring under normal conditions, and a thermostat for lessening the restraining force of said weight upon said plug under conditions other than normal whereby said plug will close under the action of said spring.

7. In a gas controlling apparatus the combination of a gas controlling plug or valve, means constantly urging the plug or valve to closed position, manually operable means for moving said plug or valve in the opposite direction, a weight, a pin adapted to be forced by said lever or weight into engagement with said plug, a second lever having a weight attached thereto and connected to said first mentioned lever and so arranged as to increase the weight of said first mentioned lever whereby the pressure on said plug will be increased, and a thermostat for raising the second lever under predetermined conditions whereby said plug or valve will close automatically.

8. In a gas controlling apparatus the combination of a plug or valve, means constantly urging said plug or valve to closed position, means for maintaining said plug or valve in open position under predetermined conditions, a burner the supply of gas to which is controlled by said plug, a thermostat controlled by the heat from said burner, said thermostat being operatively connected to said gas controlling plug or valve whereby when the flame at said burner is extinguished said gas controlling plug or valve will be permitted to move to closed position.

9. In a gas controlling apparatus the combination of a main valve or cock having a stem provided with ports, a gas controlling plug or valve in said stem and adapted to control said ports, means operable under predetermined conditions to move said plug automatically to closed position, means for holding said plug in open position and means controlled by said stem for controlling said last mentioned means whereby as said stem is moved to closed position said plug will be automatically released and permitted to move to closed position.

10. In a gas controlling apparatus the combination of a gas controlling plug or valve, a plug controlling rod operatively connected to said plug, a spring for moving said plug to closed position, a pin co-operating with said rod, a system of levers adapted to exert a pressure upon said pin to move the same into frictional engagement with said rod to hold the plug in open position against the action of its spring, one end of one of said levers being pivoted, the other end carrying a weight, and said pin being engaged by said lever intermediate the ends of the lever, the other of said levers being pivoted at one end and carrying a weight at its opposite end, said levers and weights being so arranged as to provide the maximum pressure on said pin.

11. In a gas controlling apparatus the combination of a gas controlling plug, a spring for constantly exerting pressure on said plug in a direction to close the same, a plurality of levers and rods operatively connected to said plug to prevent under normal conditions the movement of said plug toward closed position, a thermostat for raising one of said rods and the lever attached thereto, a catch connected to said thermostat and adapted to engage the upper end of one of said rods to raise the same, and a cam surface adjacent the upper end of said rod and adapted to cooperate with said catch to cause the same to be moved into and out of engagement with the head or upper end of said rod for the purpose set forth.

12. In a gas controlling device the combination of a gas controlling plug, a weight for controlling the same, and a thermostat for raising said weight under predetermined conditions to permit said plug to close automatically.

This specification signed this 29th day of November, 1924.

RUDOLF LIEFKE.